United States Patent [19]

Riutta

[11] Patent Number: 4,539,758

[45] Date of Patent: Sep. 10, 1985

[54] MEASURING APPARATUS

[76] Inventor: Raine R. Riutta, 8326 French St., Vancouver, British Columbia, Canada V6P 2W2

[21] Appl. No.: 543,797

[22] Filed: Oct. 21, 1983

Related U.S. Application Data

[63] Continuation-in-part of Ser. No. 367,197, Apr. 12, 1982.

[30] Foreign Application Priority Data

Sep. 18, 1981 [CA] Canada .................................. 386200
Mar. 10, 1982 [CA] Canada .................................. 398046

[51] Int. Cl.³ .............................................. G01B 5/25
[52] U.S. Cl. .................................. 33/180 AT; 33/288
[58] Field of Search .......... 33/180 AT, 181 AT, 288, 33/228, 335

[56] References Cited

U.S. PATENT DOCUMENTS

| | | | |
|---|---|---|---|
| 3,108,629 | 10/1963 | Jenkins ................................. | 72/457 |
| 3,338,186 | 8/1967 | Herian .................................. | 105/369 |
| 3,382,583 | 5/1968 | Melton et al. .................... | 33/181 AT |
| 3,590,623 | 7/1971 | Hunnicutt et al. .................... | 72/302 |
| 3,869,767 | 3/1975 | Hunnicutt et al. ............. | 24/243 CC |
| 3,921,433 | 11/1975 | Whitney ................................ | 72/461 |
| 4,098,003 | 7/1978 | Ne'grin .......................... | 33/180 AT |
| 4,159,574 | 7/1979 | Samuelsson et al. ................. | 33/288 |
| 4,193,203 | 3/1980 | Le Grand et al. ............. | 33/180 AT |
| 4,238,951 | 12/1980 | Grainger et al. ...................... | 72/457 |
| 4,289,016 | 9/1981 | Hare ...................................... | 72/457 |
| 4,375,131 | 3/1983 | Jarman et al. ................. | 33/180 AT |

FOREIGN PATENT DOCUMENTS 2030633 4/1980 United Kingdom .

OTHER PUBLICATIONS

Blackhawk Body Repair Accessories, "Tram Track Gage", Automotive Division Applied Power, Inc., Catalogue No. G667-M9538-879-26.

Primary Examiner—Willis Little
Attorney, Agent, or Firm—Townsend and Townsend

[57] ABSTRACT

Measuring apparatus for use in vehicle collision repair work. The measuring apparatus comprises first and second telescopic extension members each having a first end for affixation, respectively, at first and second reference points. A cross-member is connectible between the second ends of the extension members. Indicator means are provided on each extension member for indicating displacement between the extension member first and second ends. Alignment means are also provided for aligning the extension member second ends on opposite sides of the vehicle center line and at equal distances from that center line. Third and fourth indicator means are also provided for indicating, respectively, the vertical height of third and fourth reference points above a reference line defined by the extension member second ends. The third and fourth indicator means also indicate, respectively, horizontal displacement of the third and fourth reference points from the vehicle center line. The measuring apparatus may be quickly connected to most collision damaged vehicles despite the presence of obstructions which frequently interfere with conventional measuring apparatus. The collision repairman may then, without moving away from the front of the vehicle, align the measuring system with respect to the damaged vehicle, lock it into position and obtain measurements indicative of the extent of collision damage to the vehicle.

23 Claims, 11 Drawing Figures

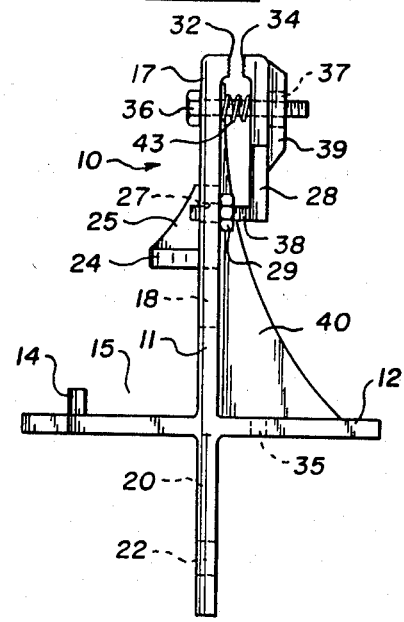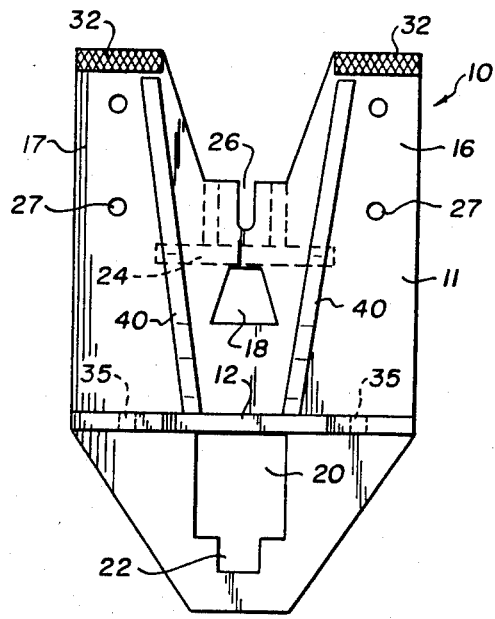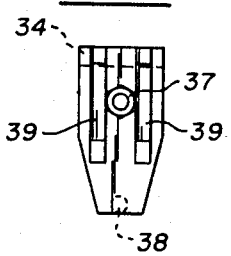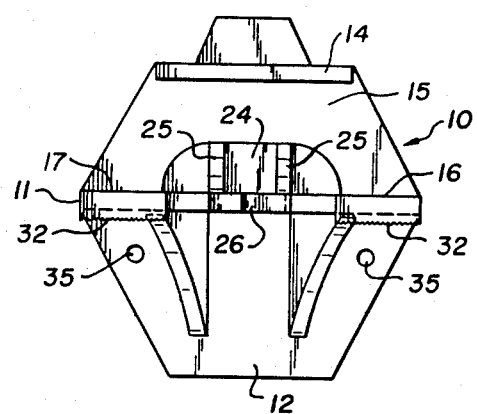

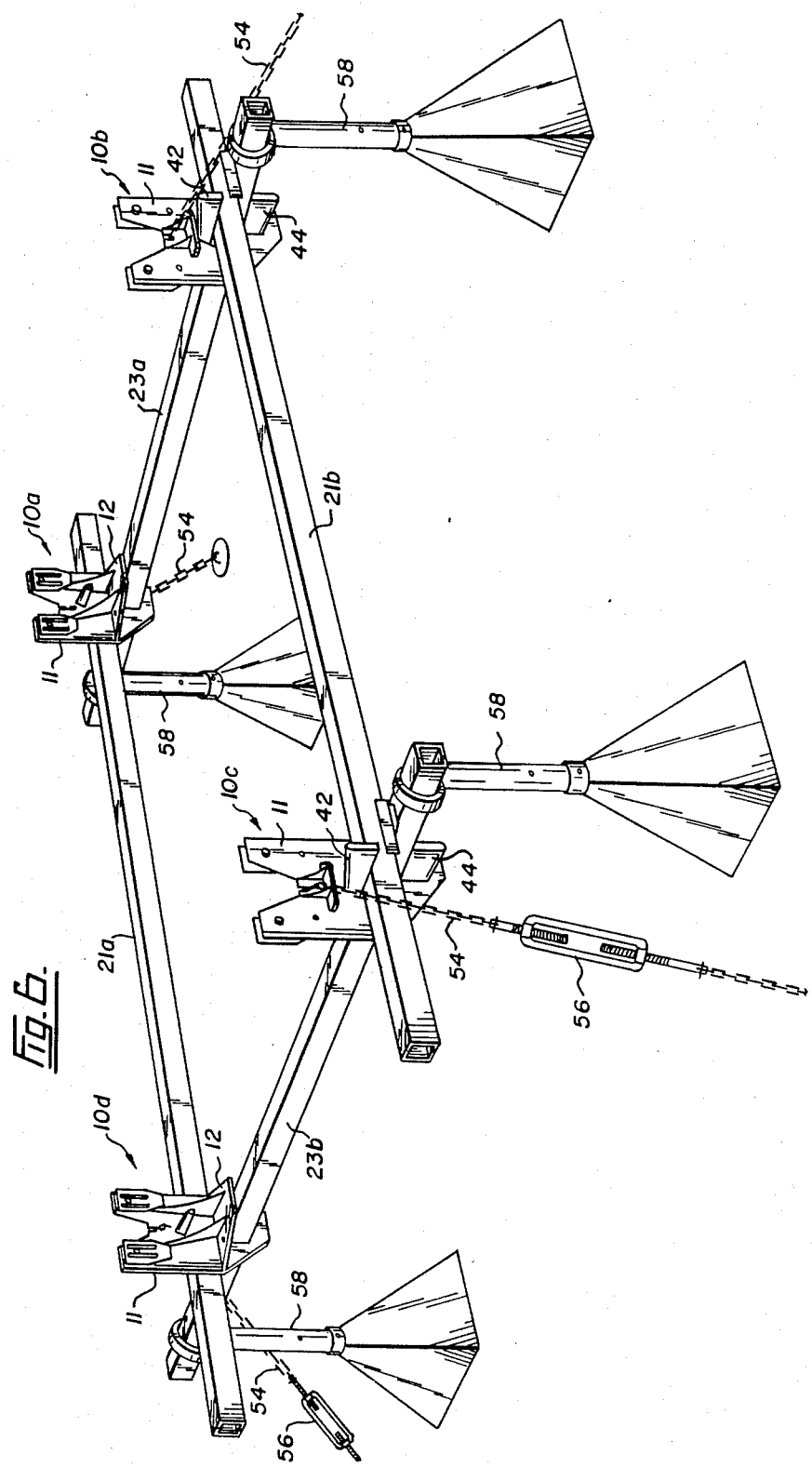

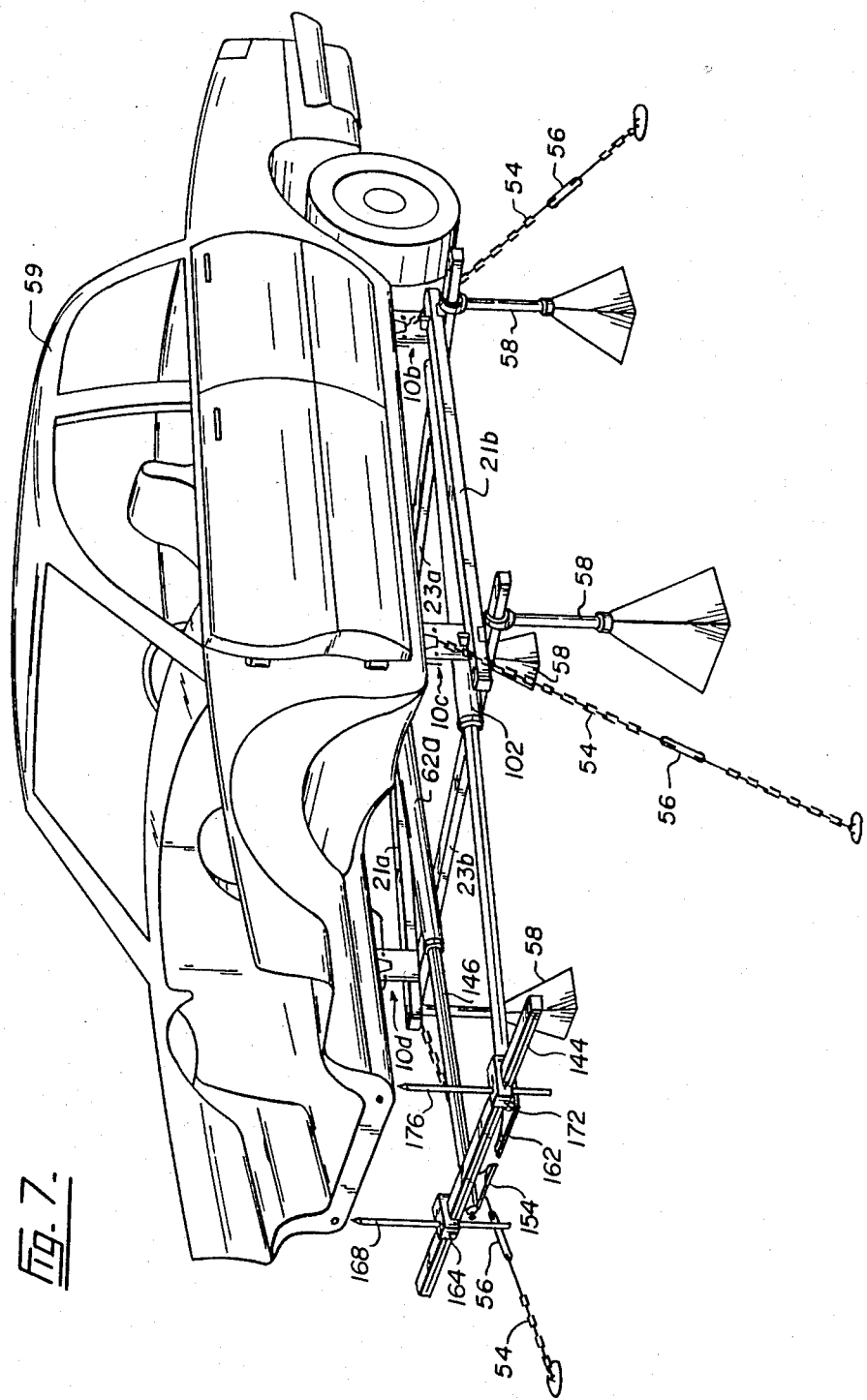

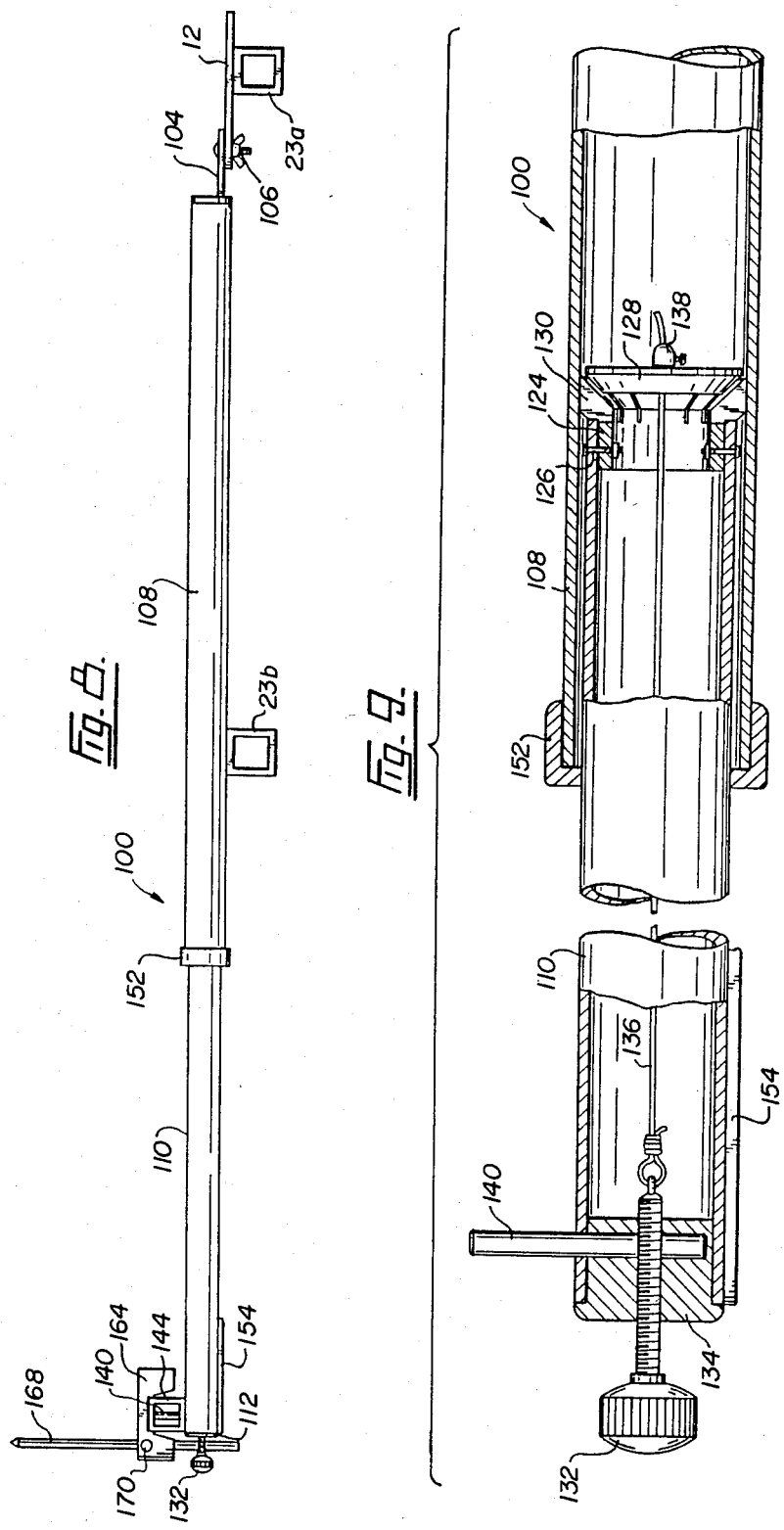

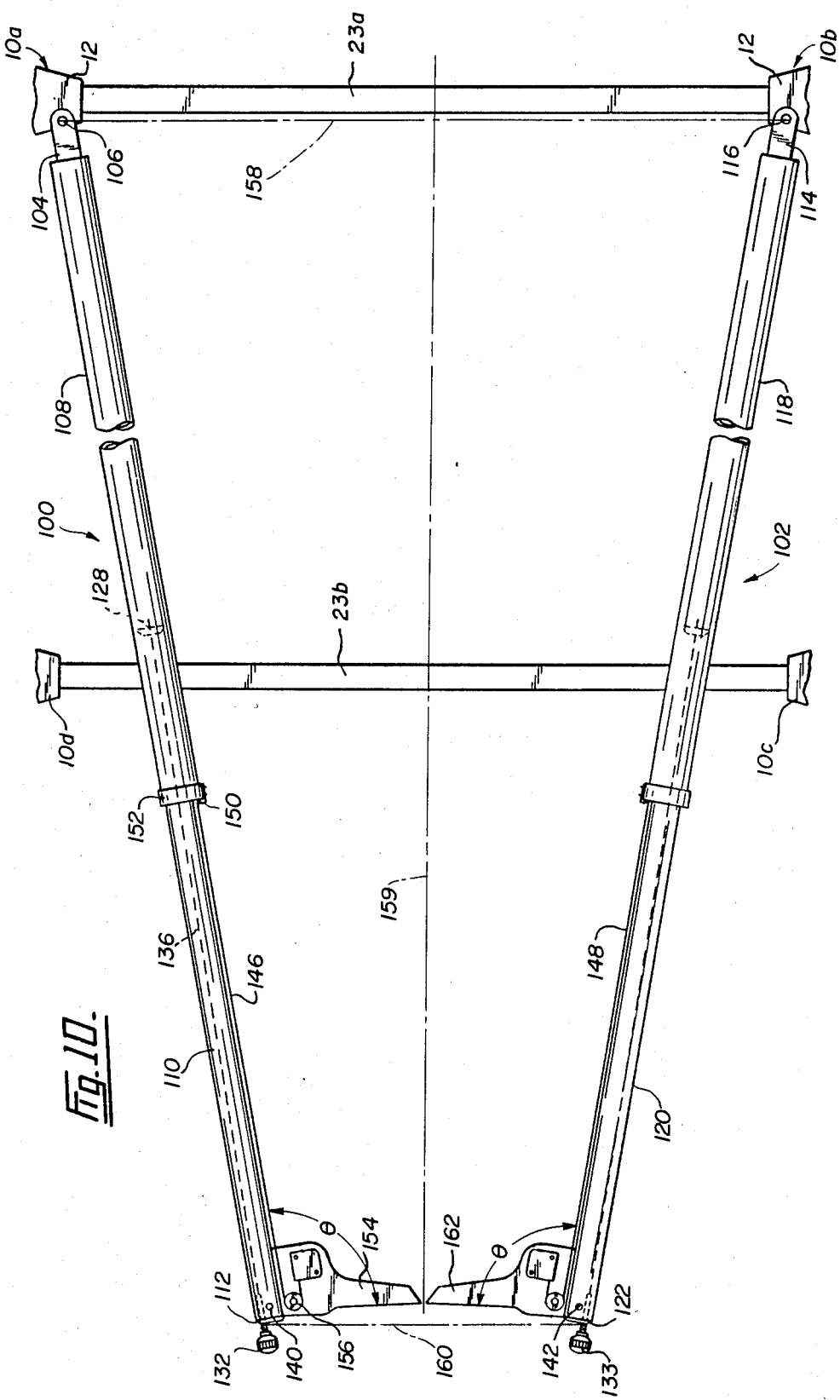

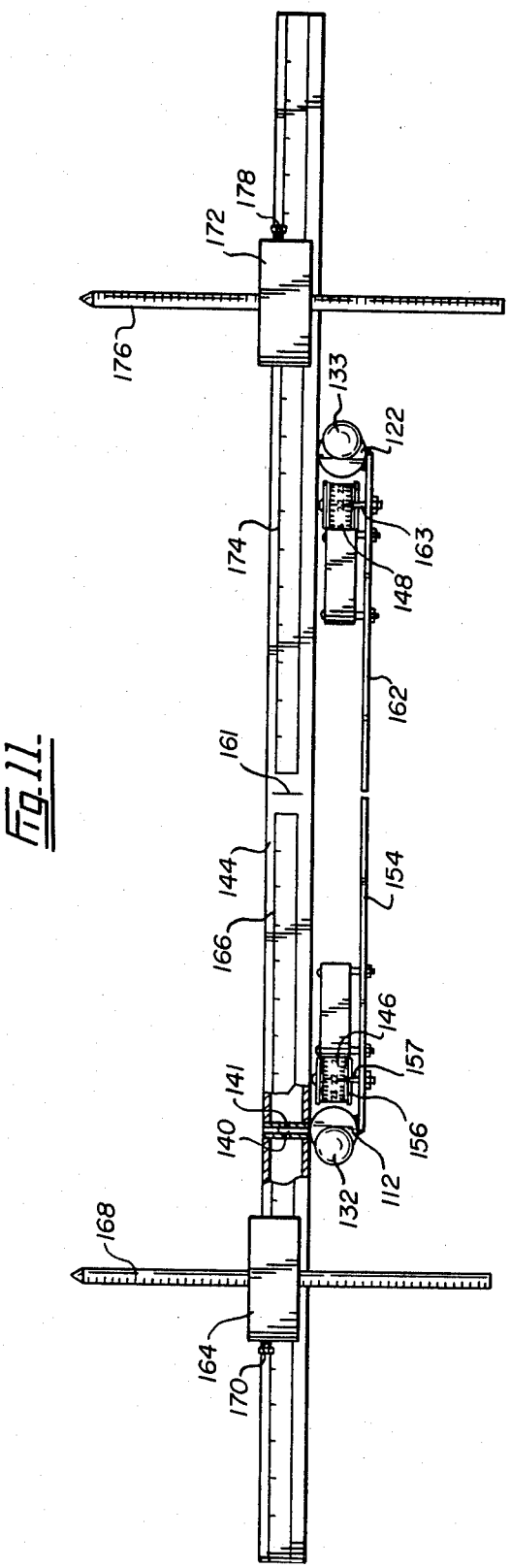

MEASURING APPARATUS

CROSS-REFERENCE TO RELATED APPLICATION

This application is a continuation-in-part of U.S. application Ser. No. 367,197 filed Apr. 12, 1982.

FIELD OF THE INVENTION

This invention pertains to measuring apparatus for use in vehicle collision repair work. In particular, the apparatus facilitates measurement of the extent of collision damage to a vehicle before, during and after the collision repair procedures.

BACKGROUND OF THE INVENTION

Collision damaged vehicle bodies must be accurately measured to enable skilled persons to repair the collision damage. Initially, measurements are made between a number of pre-selected points on a collision damaged vehicle. The measurements so made are checked against the vehicle manufacturer's specifications for an undamaged vehicle to obtain an indication of the extent of the collision damage. Known techniques are then used to repair the collision damage by forcing the damaged vehicle body back into its original configuration as defined by the manufacturer's specifications. Further measurements are made as the repair work progresses to enable skilled repairmen performing the repair work to assess the effect of their efforts and control the repair procedures. When the collision damage has been repaired, final measurements are made to check that the vehicle body has been returned to its original shape and configuration as defined by the manufacturer's specifications.

Various measuring systems have been provided for use in collision repair shops. However, these have proved extremely awkward to use. Typically, for example, known vehicle measurement apparatus cannot readily be connected to a collision damaged vehicle, due to the presence of obstructions such as the vehicle clamping and support apparatus used to hold the damaged vehicle in a fixed position while repair work is done. The inventor has found that skilled collision repair workers often ignore expensive conventional measuring systems of this sort, preferring to rely on a simple tape measure rather than having to fumble with an awkward measuring system which requires a lot of cumbersome set-up time. However, tape measures do not facilitate measurement accuracy of the degree required to repair collision damage to many modern vehicles. Such prior art measuring systems are also inconvenient to use because they typically require the repairman to take measurements at a number of different points around the perimeter of the damaged vehicle, thus requiring the repairman to continually move around the vehicle while taking measurements.

The present invention overcomes these disadvantages by providing a measuring apparatus of highly simplified construction which may be readily utilized with virtually any collision damaged vehicle. The preferred embodiment of the invention provides an extremely compact measuring apparatus which may be easily fitted to most collision damaged vehicles in spite of the presence of vehicle clamping and support systems, exhaust systems, or other obstructions which frequently interfere with known vehicle measuring systems. Furthermore, the preferred embodiment of the present invention provides a measuring apparatus which enables the operator to align the measuring apparatus with respect to the vehicle and take all measurement readings without moving from the front of the vehicle, thus greatly simplifying use of the apparatus and expediting collision repair procedures.

SUMMARY OF THE INVENTION

In accordance with the invention, there is provided a measuring apparatus comprising a first extension member having a first end for affixation at a first reference point and having a second end extendible away from the first end, a second extension member having a first end for affixation at a second reference point and having a second end extendible away from the second extension member first end, a cross-member connectible between the extension member second ends, first indicator means on the first extension member for indicating displacement between the first extension member first and second ends, and second indicator means on the second extension member for indicating displacement between the second extension member first and second ends.

Advantageously, the apparatus also comprises alignment means for aligning the extension member second ends on opposite sides of a notional centre line and at equal distances from that centre line.

The first and second reference points may define the ends of a first reference line. The extension member second ends may define the ends of a second reference line. The apparatus may then further comprise alignment means for aligning the second reference line parallel to the first reference line. Preferably, the alignment means is capable of aligning the extension member second ends at equal distances on opposite sides of a perpendicular bisector of the first reference line.

The apparatus may also comprise third indicator means for indicating the height of a third reference point above the second reference line and fourth indicator means for indicating the height of a fourth reference point above the second reference line. The third and fourth indicator means preferably also indicate horizontal displacement between the aforementioned perpendicular bisector and the third and fourth reference points, respectively.

Advantageously, the first and second extension members may each comprise a sleeve and an insert slideably retractable within the sleeve and slideably extendible therefrom. Locking means may be provided for locking the extension member inserts with respect to their respective sleeves.

Preferably, the first and second indicator means each comprise a measuring tape having a first end fixed with respect to the first end of the respective extension members and having a second end fixed with respect to the second end of the respective extension members, whereby extension or retraction of the extension member second ends with respect to the extension member first ends correspondingly extends or retracts the measuring tapes, thereby indicating displacement between the extension member first and second ends.

The alignment means may comprise a first alignment member fixed to the second end of the first extension member to project from the first extension member at a selected angle with respect thereto, and a second alignment member equal in length to the first alignment member, the second alignment member being fixed to the second end of the second extension member to project from the second extension member at an angle with respect to the second extension member equal to the selected angle, whereby end-to-end positioning of the alignment members locates the aforementioned perpendicular bisector, aligns the second reference line parallel to the first reference line and aligns the extension member second ends at equal distances on opposite sides of the aforementioned perpendicular bisector.

The third and fourth indicator means may each comprise an indicator member horizontally slideably mounted on the cross-member and vertically slideably extendible with respect thereto. Indicator means may be provided on the cross-member for indicating horizontal displacement of the indicator members along the cross-member.

BRIEF DESCRIPTION OF THE DRAWINGS

FIG. 2 is a side elevation view of the clamping device of FIG. 1.

FIG. 3 is a rear elevation view of a portion of the clamping device of FIGS. 1 and 2.

FIG. 4 is a rear elevation view of one of the clamp jaws of the clamping device of FIGS. 1 and 2.

FIG. 5 is a top view of the clamping device portion of FIG. 3.

FIG. 6 is a pictorial illustration of a vehicle clamping and support apparatus adapted for use with the preferred measuring apparatus.

FIG. 7 is a pictorial illustration of a vehicle supported by the vehicle clamping and support apparatus of FIG. 6 and showing the preferred measuring apparatus in position for taking measurements.

FIG. 8 is a side elevation view of an extension member and the cross-member of the preferred measuring apparatus.

FIG. 9 is an enlarged, partially fragmented side elevation view of a portion of the extension member of FIG. 8.

FIG. 10 is a top plan view of the preferred measuring apparatus. The measuring apparatus cross-member is not shown in FIG. 10 to avoid obscuring details of the alignment means.

FIG. 11 is a partially fragmented front elevation view of the preferred measuring apparatus, including the measuring apparatus cross-member.

DETAILED DESCRIPTION OF A PREFERRED EMBODIMENT OF THE INVENTION

Figure 1:
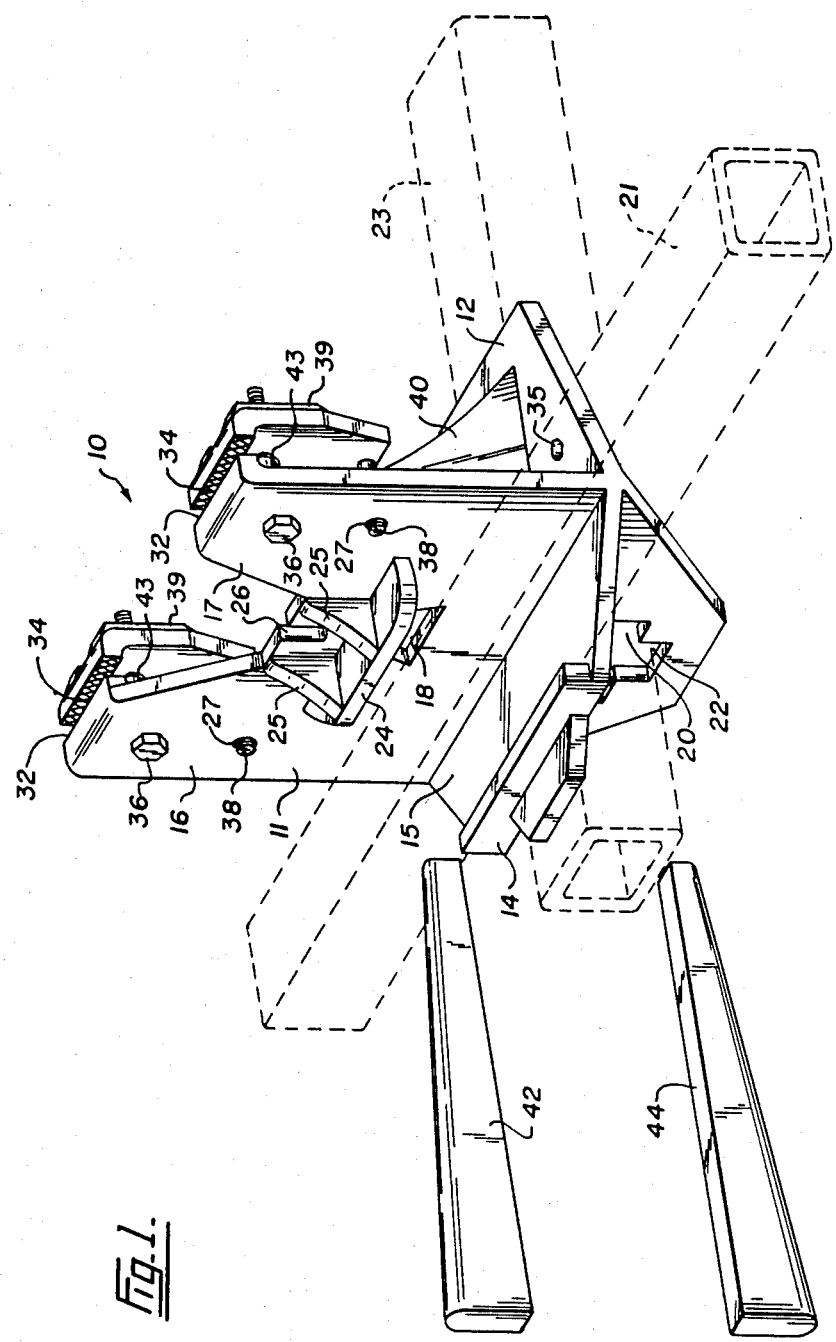
FIG. 1 is a pictorial representation of a clamping device adapted for use with the preferred measuring apparatus.

To give those skilled in the art a framework for understanding the construction and operation of the preferred embodiment, vehicle clamping and support apparatus adapted for use with the preferred measuring apparatus is first described. Those skilled in the art will however appreciate that the measuring apparatus of the present invention is of universal application and may be easily adapted for use with other vehicle clamping and support systems known in the collision repair art. Indeed, the measuring apparatus of the present invention need not necessarily be utilized with any vehicle clamping and support apparatus but may be used on its own with separate support apparatus in situations where vehicle measurements are desired apart from any requirement for performing collision repair work on he vehicle.

Vehicle Clamping and Support Apparatus

FIG. 1 illustrates a clamping device 10 of heavy steel plate or other high strength material construction which includes a "clamping means" disposed towards the upper end of device 10 for clamping to a vehicle body. Clamping device 10 also includes a "securing means" disposed toward the lower end of device 10 for releasably securing first and second transverse support members 21, 23 (phantom lines are used in FIG. 1 to illustrate support members 21, 23 to avoid obscuring details of the clamping device 10).

In the preferred embodiment, the "clamping means" of clamping device 10 comprises first and second clamps 16, 17 which are spaced apart from one another. Each of clamps 16, 17 includes a pair of jaws 32, 34 having serrated teeth. Compression springs 43 urge jaw pairs 32, 34 apart. Bolts 36 pass through jaws 32, springs 43 and jaws 34 and threadably enagage nuts 37 (held between flanges 39 as shown in FIG. 4) thereby limiting the opening of jaw pairs 32, 34. Threaded studs 38 are affixed, respectively, at one end, to the lower ends of jaws 34. The opposite ends of studs 38 protrude through apertures 27 in body plate 11. Studs 38 are not threaded into apertures 27 but simply slide with respect thereto. Nuts 29 are threaded onto studs 38 and positioned between jaws 32, 34. Rotation of nuts 29 on studs 38 to advance nuts 29 toward body plate 11 causes jaws 34 to pivot about nuts 37 and toward jaws 32. Clamping device 10 is easily clamped to a vehicle body by positioning clamps 16, 17 over the vehicle underbody pinch welds, with jaws 32 toward the outside of the vehicle and jaws 34 toward the inside of the vehicle. A wrench is then used to tighten nuts 29 against body plate 11, thereby securely clamping the vehicle underbody pinch welds in clamps 16, 17.

The "securing means" of clamping device 10 preferably comprises body plate 11, support plate 15 which is rigidly affixed to body plate 11 at right angles thereto, and flange 14 which is rigidly affixed to support plate 15 at right angles thereto. Body plate 11, flange 14 and support plate 15 define a generally "U" shaped trough for slideably engaging and supporting first support member 21 as shown in FIG. 1. The "securing means" also comprises an aperture 20 formed in bod plate 11 beneath support plate 15. The cross sectional area of aperture 20 is made slightly larger than the cross sectional area of second support member 23 so that support member 23 will easily slide through aperture 20.

The "securing means" of clamping device 10 also preferably includes first and second wedges 42, 44. Once first support members 21 has been slideably positioned on clamping device 10, first wedge 42 is driven into first wedge aperture 18, thereby firmly wedging support member 21 against support plate 15. Plate 24, which is reinforced by flanges 25, provides a bracing surface against which wedge 42 acts to wedge first support member 21 against support plate 15. As shown in FIG. 1, the upper surface of first wedge 42 is rounded. This is because support member 21 may tend to slip along its longitudinal axis when forces typically encountered in collision repair work are applied to the clamped vehicle. When such slippage occurs, the rounded edge of first wedge 42 permits limited rotation of wedge 42, such that the squared corners of the lower, nonrounded surface of wedge 42 tend to "bite" into the top surface of support member 21, thereby further wedging support member 21 against support plate 15 and resisting slippage of support member 21.

Second wedge 44 is driven into second wedge aperture 22 after second support member 23 has been slideably positioned in aperture 20. Second wedge 44 wedges second support member 23 against the bottom of support plates 12 and 15. Although the drawings show second wedge 44 as having a rounded surface similar to that of first wedge 42, it has been found that second support member 23 is not as likely to slip during collision repair work as is first support member 21, and so inclusion of the rounded surface on second wedge 44 is optional.

As FIG. 1 shows, clamping device 10 releasably secures first and second support members 21, 23 in transverse relationship. Clamping device 10 defines the point of cross over of members 21, 23 and readily facilitates adjustment of that point of cross over by sliding either of members 21 or 23 with respect to clamping device 10. Preferably, clamping device 10 is constructed such that the point of cross-over of members 21, 23 is maintained at least six inches below the point at which jaw pairs 32, 34 clampingly engage the vehicle body. This is to ensure adequate clearance between support members 21, 23 and obstructions such as the vehicle underbody, exhaust system etc. and also to provide clearance for measuring apparatus which, in some cases, may be inserted between support members 21, 23 and the vehicle underbody to obtain measurements for guiding collision repair work on the vehicle.

Clamping device 10 also preferably includes a "connecting means" such as notch 26 which is sized to releasably, slideably secure one link of a chain, thus facilitating attachment of an end of the chain to clamping device 10. The opposite end of the chain may be affixed, in known fashion, to a pulling device or to a fixed support. As may be seen in FIG. 3, notch 26 is located on a central vertical axis of clamping device 10, midway between clamps 16 and 17.

In operation, a collision repairman selects four separate clamping devices like that shown at 10 in FIG. 1, and roughly adjusts the spacing between jaw pairs 32, 34 of each clamping device with the aid of nuts 29, bolts 36 and nuts 37. The four clamping devices are then securely clamped over the vehicle underbody pinch welds as described above. One pair of clamping devices is clamped on opposite sides of the vehicle underbody, towards the rear of the vehicle. The second pair of clamping devices is clamped on opposite sides of the vehicle underbody, towards the front of the vehicle. The rear pair of clamping devices must be positioned at equal distances from the front of the vehicle to align apertures 20 of the rear pair of clamping devices so that a support member like that shown at 23 in FIG. 1 may easily slide through apertures 20 of the rear pair of clamping devices. Similarly, the front, or second pair of clamping devices must be positioned at equal distances from the front of the vehicle to align apertures 20 of the front pair of clamping devices so that another support member, also like that shown at 23 in FIG. 1, may easily slide through apertures 20 of the front pair of clamping devices.

Since four separate clamping devices are used, their positioning on the vehicle underbody is largely arbitrary (although the front and rear clamping devices must be aligned as just described). Thus, maximum flexibility is provided in the selection of points at which the clamping devices are clamped to the vehicle underbody.

FIG. 6 is a pictorial illustration of a vehicle clamping and support apparatus which includes four clamping devices of the type shown in FIG. 1 and four support members. The vehicle has been omitted from FIG. 6 to avoid obscuring details of the vehicle clamping and support apparatus. In FIG. 6 the reference numerals 10a, 10b, 10c and 10d designate, respectively, first, second, third and fourth clamping devices of the type shown and described above with reference to FIG. 1. First and second clamping devices 10a, 10b are clamped on opposite sides of the vehicle underbody, towards the rear of the vehicle as described above. Third and fourth clamping devices 10c, 10d are clamped on opposite sides of the vehicle underbody, towards the front of the vehicle, as described above. First support members 21a is then positioned along one lateral underside of the vehicle by sliding first support member 21a along the "U" shaped troughs formed by body plate 11, flange 14 and support plate 15 in each of first and fourth clamping devices 10a, 10d. Second support member 21b is positioned, in similar fashion, along the other lateral underside of the vehicle by slideably supporting second support member 21b on second and third clamping devices 10b, 10c. Four separate wedges 42 are then driven into wedging apertures 18 of each of clamping devices 10a, 10b, 10c and 10d to secure first and second support members 21a, 21b. Third support member 23a is then positioned along the rear underside of the vehicle, transversely to support members 21a, 21b, by sliding third support member 23a through apertures 20 in each of clamping devices 10a, 10b. Fourth support member 23b is positioned in similar fashion, along the front underside of the vehicle, by sliding fourth support member 23b through apertures 20 in clamping devices 10c, 10d. Four separate wedges 44 are then driven into wedging apertures 22 in each of clamping devices 10a, 10b, 10c and 10d to secure third and fourth support members 23a, 23b. The vehicle is thus clamped and secured to a rigid support framework comprising first and second support members 21a, 21b and third and fourth support members 23a, 23b.

Jacks 58 or other convenient means may be used to raise or lower the vehicle on the support framework. Ends of chains 54 may be releasably secured to notches 26 in each of clamping devices 10a, 10b, 10c and 10d. The opposite ends of chains 54 may be secured to convenient supports such as shop floor pots or a frame rack. Turnbuckles 56 may be provided to adjust the tension in each of chains 54.

Once the vehicle is clamped and supported as described above, collision damage to the vehicle may be repaired in conventional fashion to force the damaged vehicle body back into its original shape. When the collision repair work has been completed, the apparatus is easily disassembled by releasing chains 54 from notches 26, knocking out wedges 42, 44 at each clamping device, slideably removing support members 21a, 21b, 23a and 23b and releasing clamps 16, 17 at each clamping device.

Measuring Apparatus

With reference to FIG. 10, the measuring apparatus of the present invention comprises a first extension member generally designated 100 and a second extension member generally designated 102. First extension member 100 has a first end 104 for affixation at a first reference point 106. First reference point 106 may conveniently coincide with aperature 35 (not shown in FIG. 10) in support plate 12 of clamping device 10a (only a portion of which is shown in FIG. 10). A loose fitting bolt or other convenient means pivotally connects first extension member first end 104 to clamping device 10a at first reference point 106 as shown in FIG. 8. The clamped position of clamping device 10a on the vehicle underbody is preferably selected to position clamping device 10a at a known distance from a selected reference point on the vehicle with respect to which vehicle body measurements are conventionally made, such as assembly jig holes locations used by vehicle manufacturers.

First extension member 100 comprises a sleeve portion 108 and an insert portion 110 which is slideably retractable within sleeve 108 and slideably extendible therefrom in telescopic fashion. First extension member 100 has a second end 112 opposite to first end 104. End 112 may be extended away from end 104 by slideably extending insert 110 from sleeve 108.

Second extension member 102 has a first end 114 for affixation at a second reference point 116. Aperture 35 (not shown in FIG. 10) in second clamping device 10b may conveniently define second reference point 116. Second extension member first end 114 is pivotally connected to clamping device 10b at second reference point 116. Clamping device 10b, which defines second reference point 116, should be carefully positioned on the vehicle underbody to locate second reference point 116 with respect to first reference point 106 such that line 158 passing through first and second reference points 106, 116 is perpendicular to the notional "centre line" of the vehicle, in its undamaged state (shown at 159 in FIG. 10).

As shown in FIGS. 7, 8 and 10, extension members 100, 102 are supported at their respective first ends by pivotal connection to clamping devices 10a, 10b. Support member 23b (which is secured to clamping devices 10c, 10d which, in turn, are clamped to the vehicle underbody) also supports extension members 100, 102. Of course, any convenient means may be used to support extension members 100, 102 and fix ends 104, 114 with respect to the vehicle underbody.

Second extension member 102 is in all respects identical to first extension member 100. Accordingly, second extension member 102 comprises a sleeve 118 and an insert 120 telescopically slideably receiveable within sleeve 118 and extendible therefrom. Second end 122 of second extension member 102 may accordingly be extended away from end 114.

First and second extension members 100, 102 are each provided with a locking means (best seen in FIG. 9 in respect of first extension member 100) for locking inserts 110, 120 with respect to sleeves 108, 118. Since the construction and operation of the locking means on first extension member 100 is in all respects identical to that on second extension member 102, it is only necessary to describe the locking means on first extension member 100 in detail. In the preferred embodiment, the locking means comprises a split bushing 124 which is fixed, with nuts and bolts 126, in the end of insert 110 which projects inside sleeve 108. Flared projection 128 is thus left to protrude from the end of insert 110. Wedging disk 130 is positioned between flared projection 128 and the end of insert 110. Knurled bolt 132 is threaded into plug 134 fixed in the opposite end of insert 110. Line 136 is held in tension within insert 110 between bolt 132 and stop 138 which prevents line 136 from being drawn through flared projection 128. Rotation of bolt 132 so as to withdraw bolt 132 from plug 134 increases the tension on line 136 which, in turn, causes flared projection 128 to splay outward against wedging disk 130, forcing the outer circumferencial edge of disk 130 into tight contact with the inner wall of sleeve 108, thereby locking insert 110 with respect to sleeve 108. Bolt 132 thus serves as a "lock engaging means" for preventing slideable movement of insert 110 with respect to sleeve 108.

Pins 140, 142 (FIGS. 9, 10 and 11) fixed, respectively, at second ends 112, 122 of first and second extension members 100, 102 project upward and serve as pivot points for insertion within mating apertures 141 (only one of which is shown in FIG. 11) in cross-member 144. Cross-member 144 is thus connectible between second ends 112, 122 of first and second extension members 100, 102.

As may be seen in FIGS. 10 and 11, first and second measuring tapes 146, 148 are provided, respectively, on first extension member 100 and on second extension member 102. Since the construction and operation of measuring tapes 146, 148 is in all respects identical, it is only necessary to describe first measuring tape 146 in detail. First measuring tape 146 is a conventional measuring tape of the type which is retractably wound within the measuring tape case by a spring (not shown). A first end 150 of first measuring tape 146 is fixed with respect to first extension member first end 104 by welding or bolting end 150 onto collar 152 which caps sleeve 108. Since the length of sleeve 108 does not vary, this fixes measuring tape end 150 with respect to first extension member first end 104 and, more particularly, with respect to first reference point 106. The opposite, or "second" end (not shown, but coiled within the measuring tape case) of first measuring tape 146 is fixed with respect to second end 112 of first extension member 100. This is accomplished, in the preferred embodiment, by mounting the measuring tape case on alignment arm 154. First measuring tape 146 is guided around rotatable pulley 156 which is rotatably mounted on alignment arm 154.

Since first measuring tape first end 150 is fixed with respect to first extension member first end 104, and since the measuring tape second end is fixed with respect to first extension member second end 112, extension of first extension member second end 112 away from first extension member first end 104 causes a corresponding extension of measuring tape 146 by withdrawing the measuring tape from its case along the edge of insert 110. Similarly, telescopic retraction of insert 110 within sleeve 108 causes corresponding retraction of the measuring tape within its case. In either case, a relative indication of the displacement between first extension member first and second ends 104, 112 is provided by indicator 157 (FIG. 11) which is fixed on alignment arm 154 with respect to first measuring tape 146. First measuring tape 146 thus constitutes a "first indicator means" on first extension member 100 for indicating displacement between first extension member first and second ends 104, 112. Similarly, second measuring tape 148 constitutes a "second indicator means" on second extension member 102 for indicating displacement between the first and second ends 114, 122 of second extension member 102.

First and second reference points 106, 116 may be taken as defining the ends of a "first reference line" 158 (FIG. 10). Similarly, second ends 112, 122 of first and second extension members 100, 102 may be taken as defining the ends of a "second reference line" 160. By aligning first and second reference lines 158, 160 as hereinafter described, the collision repairman may obtain an indication of some aspects of the extent of collision damage to a vehicle. In particular, by aligning second reference line 160 parallel to first reference line 158 and then examining the location of selected reference points on the vehicle with respect to the vehicle centre line 159, the collision repairman may determine the extent to which the front or rear end of the damaged vehicle has been knocked out of alignment and the extent of the repair work required to re-align the vehicle. This, of course, assumes that clamping devices 10a, 10b which define first and second reference points 106, 116 are positioned such that first reference line 158 is perpendicular to the notional "centre line" of the vehicle, in its undamaged state (shown at 159 in FIG. 10).

First and second alignment arms 154, 162 fixed, respectively, at second ends 112, 122 of extension members 100, 102 facilitate alignment of second reference line 160 parallel to first reference line 158. Alignment arms 154, 162 also facilitate alignment of extension member second ends 112, 122 on opposite sides of vehicle centre line 159 and at equal distances from centre line 159. Stated another way, vehicle centre line 159 should constitute a perpendicular bisector of first reference line 158. First and second alignment arms 154, 162 facilitate alignment of extension member second ends 112, 122 at equal distances on opposite sides of the perpendicular bisector, thereby facilitating location of the perpendicular bisector (which is vehicle centre line 159).

First and second alignment arms 154, 162 are rigidly affixed, respectively, on second ends 112, 122 of first and second extension members 100, 102 to project equal distances from second ends 112, 122. Further, the angle "θ" (FIG. 10) at which first alignment arm 154 projects with respect to first extension member 100 is equal to the angle "θ" at which second alignment arm 162 projects with respect to second extension member 102. By manipulating second ends 112, 122 of first and second extension members 100, 102 to position first and second alignment arms 154, 162 end-to-end as shown in FIG. 10 the collision repairman may locate vehicle centre line 159 and/or align second reference line 160 parallel to first reference line 158.

Provided clamping devices 10a, 10b are affixed to the vehicle underbody such that first reference line 158 is perpendicular to vehicle centre line 159 (i.e. the centre line of the vehicle in its undamaged state) the collision repairman may quickly locate the vehicle centre line at the front or rear end of the vehicle simply by extending first and second extension members 100, 102 so that their second ends 112, 122 are at equal distances from first ends 104, 114 (this is easily done by extending inserts 110, 120 from sleeves 108, 118 to the vehicle front end so that measuring tapes 146, 148 indicate equal distances at indicators 157) and then positioning first and second alignment arms 154, 162 end-to-end. The point at which alignment arms 154, 162 meet will be vehicle centre line 159. A centre mask 161 (FIG. 11) is placed on cross-member 144 to assist in locating vehicle centre line 159.

As shown in FIGS. 8 and 11, a "third indicator means" comprising block 164 is horizontally slideably mounted on cross-member 144. Horizontal displacement of block 164 along cross-member 144 is indicated on calibrated scale 166. The "third indicator means" also comprises an indicator member 168 which is slideably mounted in block 164. Loosening of set screw 170 frees indicator member 168 to slide vertically within block 164 with respect to cross-member 144. A further calibrated scale is provided on indicator member 168 for indicating vertical displacement between the tip of indicator member 168 and cross-member 144. Accordingly, since cross-member 144, when connected at second ends 112, 122 of extension members 100, 102 is fixed with respect to second reference line 160, the "third indicator means" may be used to indicate the height of a "third reference point" (i.e. the tip of indicator member 168, which may be aligned with a point on the front of the vehicle) above second reference line 160. Further, the "third indicator means" may be used to indicate horizontal displacement between vehicle centre line 159 (i.e. the perpendicular bisector of first reference line 158) and the "third reference point".

A "fourth indicator means" structurally identical in all respects to the "third indicator means" is also provided on cross-member 144. The "fourth indicator means" comprises block 172, calibrated scale 174, indicator member 176 and set screw 178 as shown in FIG. 11.

With reference to FIGS. 7, 10 and 11, those skilled in the art will appreciate that, apart from the initial set-up of the measuring apparatus (i.e. pivotal connection of extension member first ends 104, 114 at first and second reference points 106, 116) a collision repairman may align the apparatus, lock it into position and take measurements without moving away from the end of the vehicle which is under repair. [If the front end of the vehicle is under repair then extension members 100, 102 are pivotally connected to clamping devices 10a, 10b which are clamped on opposite sides of the vehicle underbody, towards the rear of the vehicle, as described above. Extension member second ends 112, 122 then protrude at the front end of the vehicle, as shown in FIG. 7. Alternatively, if the rear end of the vehicle is under repair then extension members 100, 102 are pivotally connected to clamping devices 10c, 10d which are clamped on opposite sides of the vehicle underbody, towards the front of the vehicle, as described above. Extension member second ends 112, 122 then protrude at the rear end of the vehicle.] Specifically, as may be seen in FIG. 11, indicators 157, 163 provide, at extension member second ends 112, 122 (which may be positioned, as desired, to protrude at the front or rear ends of the vehicle) indications of the displacement between the extension member first and second ends. Knurled nuts 132, 133 enable the repairman to "lock" extension members 100, 102 from the front (or rear) of the vehicle, so as to prevent alteration of the displacement between the extension member first and second ends. The repairman may then manipulate extension members 100, 102 from his position at the front (or rear) of the vehicle to locate vehicle centre line 159 with the aid of alignment arms 154, 162 as previously described. Cross-member 144 and the third and fourth indicator means thereon can then be used to locate and measure displacements betwen points on the damaged vehicle and vehicle centre line 159 which conventionally serves as a datum for such measurements. Again, the repairman need not leave the front (or rear) of the vehicle.

As will be apparent to those skilled in the art, in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. Measuring apparatus, comprising:
   (a) a first extension member having a first end for affixation at a first reference point and having a second end extendible away from said first extension member first end;
   (b) a second extension member having a first end for affixation at a second reference point and having a second end extendible away from said second extension member first end;
   (c) a cross-member connectible between said second ends of said extension members;
   (d) first indicator means on said first extension member for indicating displacement between said first and second ends of said first extension member; and,
   (e) second indicator means on said second extension member for indicating displacement between said first and second ends of said second extension member.

2. Measuring apparatus as defined in claim 1, further comprising alignment means for aligning said extension member second ends on opposite sides of a notional centre line and at equal distances from said centre line.

3. Measuring apparatus as defined in claim 1, wherein said first and second reference points define the ends of a first reference line, and wherein said extension member second ends define the ends of a second reference line, said measuring system further comprising alignment means for aligning said second reference line parallel to said first reference line.

4. Measuring apparatus as defined in claim 3, said alignment means for further aligning said extension member second ends at equal distances on opposite sides of a perpendicular bisector of said first reference line.

5. Measuring apparatus as defined in claim 4, further comprising third indicator means for indicating the height of a third reference point above said second reference line.

6. Measuring apparatus as defined in claim 5, said third indicator means for further indicating horizontal displacement between said bisector and said third reference point.

7. Measuring apparatus as defined in claim 1, 3 or 4, wherein said first and second extension members each comprise a sleeve and an insert slideably retractable within said sleeve and slideably extendible therefrom.

8. Measuring apparatus as defined in claim 1, 3 or 4, wherein said first and second extension members each comprise a sleeve and an insert slideably retractable within said sleeve and slideably extendible therefrom, and further comprising locking means for locking said inserts with respect to said sleeves.

9. Measuring apparatus as defined in claim 1, 3 or 4, wherein:
   (a) said first indicator means comprises a first measuring tape having a first end fixed with respect to said first end of said first extension member and having a second end fixed with respect to said second end of said first extension member; and,
   (b) said second indicator means comprises a second measuring tape having a first end fixed with respect to said first end of said second extension member and having a second end fixed with respect to said second end of said second extension member; whereby extension or retraction of said extension member second ends with respect to said extension member first ends correspondingly extends or retracts said measuring tapes, thereby indicating displacement between said extension member first and second ends.

10. Measuring apparatus as defined in claim 4, wherein said alignment means comprises:
    (a) a first alignment member fixed to said second end of said first extension member to project from said first extension member at a selected angle with respect to said first extension member; and,
    (b) a second alignment member equal in length to said first alignment member, said second alignment member fixed to said second end of said second extension member to project from said second extension member at an angle with respect to said second extension member equal to said selected angle;
   whereby end-to-end positioning of said alignment members locates said bisector, aligns said second reference line parallel to said first reference line and aligns said extension member second ends at equal distances on opposite sides of said bisector.

11. Measuring apparatus as defined in claim 5, wherein said third indicator means comprises an indicator member on said cross-member and vertically, slideably extendible with respect to said cross-member.

12. Measuring apparatus as defined in claim 11, wherein said third indicator means is horizontally slideably mounted on said cross-member, and further comprising indicator means on said cross-member for indicating horizontal displacement of said indicator member along said cross-member.

13. Measuring apparatus as defined in claim 2, wherein said alignment means comprises first and second alignment members fixed, respectively, to said extension member second ends to project from said extension members at equal angles with respect thereto.

14. Measuring apparatus as defined in claim 13, wherein said first and second indicator means comprise, respectively, measuring tapes having first ends fixed with respect to said extension member first ends and having second ends fixed with respect to said extension member second ends whereby extension or retraction of said extension member second ends with respect to said extension member first ends correspondingly extends or retracts said measuring tapes, thereby indicating, at said extension member second ends, displacement between said extension member first and second ends.

15. Measuring apparatus as defined in claim 14, wherein said first and second extension members each comprise a sleeve and an insert slideably retractable within said sleeve and slideably extendible therefrom and further comprising locking means for locking said inserts with respect to said sleeves, said locking means including lock engaging means at said extension member second ends.

16. Measuring apparatus as defined in claim 15, further comprising third indicator means for indicating the height of a third reference point above said cross-member.

17. Measuring apparatus as defined in claim 16, said third indicator means for further indicating horizontal displacement between said bisector and said third reference point.

18. Measuring apparatus as defined in claim 5, further comprising fourth indicator means for indicating the height of a fourth reference point above said second reference line.

19. Measuring apparatus as defined in claim 18, said fourth indicator means for further indicating horizontal displacement between said bisector and said fourth reference point.

20. Measuring apparatus as defined in claim 11, further comprising fourth indicator means for indicating the height of a fourth reference point above said second reference line.

21. Measuring appratus as defined in claim 20, wherein said fourth indicator means comprises an indicator member on said cross-member and vertically, slideably extendible with respect to said cross-member.

22. Measuring apparatus as defined in claim 21, wherein said fourth indicator means is horizontally slideably mounted on said cross-member, and further comprising indicator means on said cross-member for indicating horizontal displacement of said indicator member along said cross-member.

23. Measuring apparatus as defined in claim 16, further comprising fourth indicator means for indicating the height of a fourth reference point above said cross-member.

* * * * *